United States Patent [19]
Rigaux et al.

[11] Patent Number: 5,309,094
[45] Date of Patent: May 3, 1994

[54] BEARING ROTARY SPEED SENSOR WITH CONCENTRIC MULTIPOLE MAGNETIC RINGS AXIALLY ALIGNED WITH COLLECTOR BRANCHES

[75] Inventors: Christian Rigaux, Artannes sur Indre; Pascal Lhote, Saint Cyr sur Loire, both of France

[73] Assignee: SKF France, Clamart Cedex, France

[21] Appl. No.: 908,415

[22] Filed: Jul. 6, 1992

[30] Foreign Application Priority Data

Jul. 5, 1991 [FR] France .................. 91 08463

[51] Int. Cl.$^5$ .................. G01P 3/48; G01P 3/54
[52] U.S. Cl. .................. 324/174; 324/207.15; 324/207.25
[58] Field of Search .................. 324/173, 174, 207.15, 324/207.2, 207.21, 207.25; 310/155, 156, 168; 348/448

[56] References Cited

U.S. PATENT DOCUMENTS 3,786,272  1/1974  Gamble et al. .
3,927,339  12/1975  Paul et al. .
5,004,358  4/1991  Varvello et al. .
5,191,284  3/1993  Moretti et al. .................. 324/207.2

FOREIGN PATENT DOCUMENTS 0464405  8/1992  European Pat. Off. .
2642236  7/1990  France .

Primary Examiner—Walter E. Snow
Attorney, Agent, or Firm—Beveridge, DeGrandi, Weilacher & Young

[57] ABSTRACT

A sensor device of speed of rotation of a rotating member mounted by way of a roller bearing on a non-rotating member, said device comprising a coder element (11) rigid with the rotating race (6) of the bearing and producing an alternating magnetic field and a sensor element (12) rigid with the non-rotating race (7) of the bearing and arranged facing the coder element with an air gap, the coder element (11) comprising two axially magnetized concentric multipole rings (14, 15), and the sensor element (12) comprising an induction coil (17) coaxial with the multipole rings cooperating with a magnetic flux concentrator (18) whose collector branches (20, 21) are oriented axially facing said multipole rings (14, 15) of the coder element. Application to motor vehicle wheel hubs equipped with an ABS system.

17 Claims, 7 Drawing Sheets

BEARING ROTARY SPEED SENSOR WITH CONCENTRIC MULTIPOLE MAGNETIC RINGS AXIALLY ALIGNED WITH COLLECTOR BRANCHES

The present invention relates to a sensor device of speed of rotation of a rotating member mounted by way of a roller bearing on a non-rotating member, said device comprising a coder element rigid with the rotating race of the bearing for producing an alternating magnetic field, and a sensor element rigid with the non-rotating race of the bearing and arranged facing the coder element with an air gap.

There is known, through French Patent Application 2 263 518, an indicator of number of revolutions for measuring the speed of rotation of a rotor consisting in mounting on the rotor a magnetic circumferential band with polarities alternating in the circumferential direction, in mounting an inductive winding on the stator coaxially with the rotor and in mounting on each side of the winding a toothed conductive metal sheet whose teeth are turned towards the magnetic poles of the rotor, the two rows of teeth being located on each occasion facing the magnetic poles of opposite polarity so as to form a magnetic flux concentrator for the induction winding. The indicator as described in this document would be difficult to incorporate within a roller bearing in view of the dimensional constraints and the leaktightness imposed by the latter. Furthermore, the significant number of components constituting the indicator makes the latter expensive to manufacture and incapable of being housed within a reduced space in a roller bearing.

A rotating leaktight seal with incorporated magnetic coder for a roller bearing is furthermore known through French Patent Application 2 642 483. This document shows a coder element in the form of a multipole ring provided with means of axial, radial and angular retention and with an abutment surface cooperating with the lining of a carrier ring. For accurate axial positioning of the coder element, the rotating race of the bearing possesses specially prepared abutment surfaces, thus substantially increasing the cost of manufacture. The sensor element is mounted fixed on the non-rotating race axially facing the coder element with an air gap. This document gives no precise information about the structure of the sensor element.

The conventional sensor devices of speed of rotation have certain technical and practical disadvantages. In order to mount them on a roller bearing, it is necessary to make provision for particular machinings of at least one of the races of the roller bearing so as to ensure accurate mounting of the device. In the known systems using a single multipole ring as coder element, part of the magnetic field lines generated by said ring is not used by the sensor. Such is the case when the active part of the sensor receiving the field lines faces only a portion of the coder element. This can be partly compensated for by using flux concentrators. There are also phenomena of magnetic field line leakage in the immediate surroundings of the multipole ring. These phenomena are detrimental to the power of the signal gathered at sensor level.

The objective of the present invention is to alleviate these disadvantages by proposing a sensor device of speed of rotation for bearings, providing a powerful signal by virtue of a reduction in the spurious leakages of the field lines emitted by the coder element, and optimal circulation of said field lines between the coder element and the concentrator allowing good looping back of said lines.

The objective of the invention is also a sensor device of speed of rotation, all the elements of which can be simply and accurately set in place in the roller bearing, without requiring particular machining on the bearing, these various improvements being obtained without increase in bulkiness and cost of manufacture.

The sensor device of speed of rotation for roller bearing, according to the invention, comprises a coder element consisting of two axially magnetized concentric multipole rings, and a sensor element consisting of an induction coil cooperating with a magnetic flux concentrator of annular shape, the coder element and the sensor element being arranged facing one another axially with an air gap.

Preferably, the two multipole rings of the coder element are arranged on a radial face of a ferromagnetic carrier mounted fixed on a rotating part of the roller bearing. The carrier can be produced in the form of an annular flange including a cylindrical span on its internal or external periphery, in order to be fitted onto the rotating part of the bearing. It is possible to produce such a support simply and economically by for example blanking and stamping from a sheet metal strip.

The two concentric multipole rings can be manufactured very economically by molding over the carrier, in a single operation, an elastomer or a plastic material loaded with particles of magnetizable material such as ferrite. Said multipole rings can be completely separated from one another or include a non-magnetized link area capable of serving for example to enhance the fastening of the rings onto the carrier. It is possible to render the multipole rings rigid with the carrier by way of fastening areas such as openings or holes in the carrier.

The magnetization of the multipole rings as circumferentially alternating polarized segments can be produced after molding over the carrier in a single operation by means of an induction coiling device. Advantageously, the two multipole rings have the same number of magnetized segments which are distributed circumferentially in a uniform manner on each ring. Moreover, the particular arrangement of two concentric rings on the same face of a flange is particularly suited to the axial magnetization in such a way as to make the magnetization of the rings particularly effective.

The coder element thus obtained is easy to set in place and position axially on a rotating part of the roller bearing by straightforward fitment, by means for example of a press with the tool for setting in place coming into axial abutment on a chosen reference face of the rotating part of the bearing.

The sensor element is of the passive type formed by an induction coil cooperating with a magnetic flux concentrator. When the coder element is driven rotationally by the rotating part of the roller bearing, the magnetic field generated by the multipole rings and received by the sensor by way of the flux concentrator varies periodically with a frequency proportional to the speed of rotation. The sensor element arranged facing the multipole rings receives magnetic field lines by way of the magnetic field concentrator.

The flux concentrator will be produced economically as a single component in an annular general shape from a metal sheet of ferromagnetic material by blanking or stamping. The concentrator includes members intended to collect the magnetic flux, arranged axially facing the multipole rings with an air gap.

Advantageously, the concentrator is in the form of an annular flange provided with a substantially flat washer-shaped radial core from which teeth, intended to collect the magnetic field lines emitted by the multipole rings, emerge axially or radially by machining without forming swarf (such as blanking or stamping).

The invention will be better understood on studying the detailed description of a few embodiments taken by way of entirely non-limiting example and illustrated by the attached drawings, in which.

Figure 1:
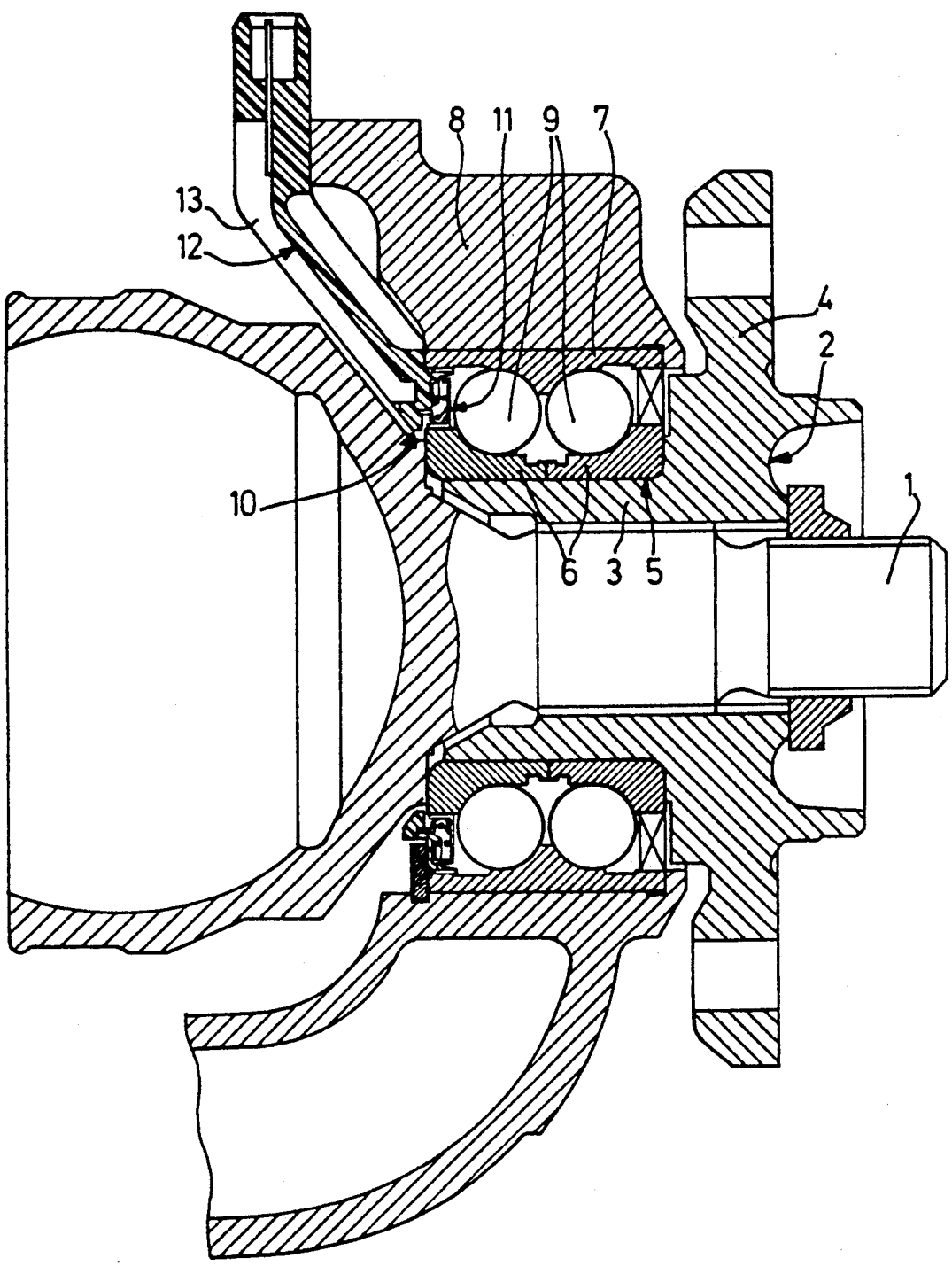
FIG. 1 is an overall view in axial section of a wheel hub equipped with the sensor device of the invention.

FIG. 1 shows a particular application of the invention to measuring the speed of rotation of the motor vehicle wheel hubs equipped with an anti-lock braking or ABS system. The hub comprises a rotating axle 1 rotationally driving a rotating element 2 which has a radial flank 3 for the mounting of a vehicle wheel and of a disk plate or brake drum (not shown). On a tubular part 4 of the rotating element 2 is mounted a roller bearing 5 having two inner races 6 made rigid with the rotating element 2, an outer race 7 made rigid with a fixed part 8 of the vehicle, and two rows of bearing balls 9 between the rotating inner races 6 and the fixed outer race 7.

A speed of rotation sensor device 10 is mounted on the side of the roller bearing 5 contrary to the radial flank 3 of the rotating element 2. The device 10 comprises a coder element 11 made rigid with a rotating inner race 6 and a sensor element 12 made rigid with the fixed outer race 7 of the roller bearing 5. The sensor element 12 is advantageously incorporated in a block molded from plastic material which is fitted axially onto the fixed outer race 7 of the roller bearing by means of a tubular metal insert. Said block can advantageously include a support and reference face permitting its accurate and easy placement with the aid of a fitting tool. A connection head 13 is provided so as to be able electrically to connect the sensor element 12 to a signal processing unit (not shown) which will permit exploitation of the measurements provided by the speed of rotation sensor device 10 for the driving of the vehicle.

Figure 2:
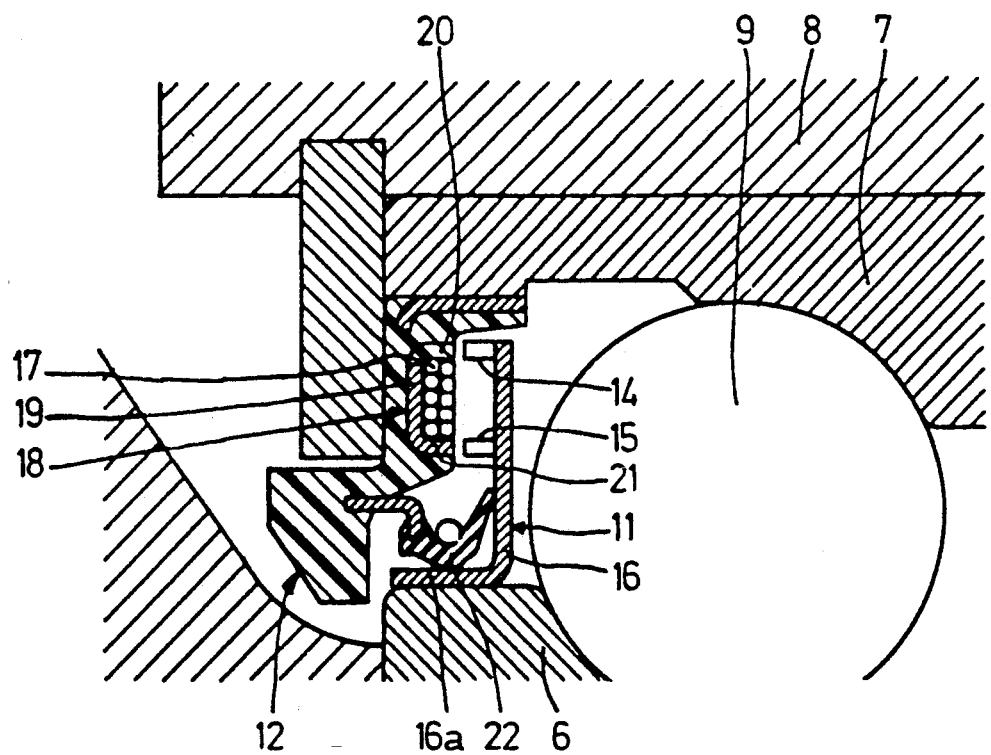
FIG. 2 is a detail view of FIG. 1 showing the structure of the device according to an embodiment of the invention.
Figure 3:
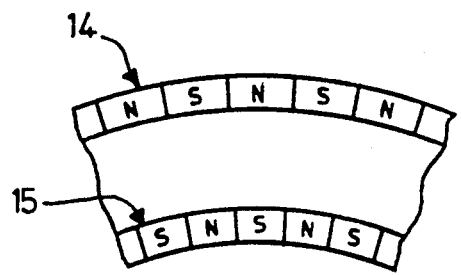
FIG. 3 is a partial schematic view of the multipole magnetic rings of the coder element according to an embodiment of the invention.

In the embodiment shown in FIG. 2, the coder element 11 comprises two concentric multipole rings 14 and 15 radially spaced apart. The outer 14 and inner 15 rings are made rigid with a radial flank of an annular flange 16. The flange 16 furthermore comprises a tubular part 16a extending axially and fitted onto a rotating inner race 6 of the roller bearing. The coder element 11 thus constituted is mounted in the radial space between the fixed outer race 7 and the rotating inner race 6 of the roller bearing. The multipole rings 14 and 15 each having an axial magnetization with a working side delimited by a common radial plane.

The sensor element 12 comprises a passive sensor 17 in the form of a winding coaxial with the axis of rotation of the bearing in order to constitute an induction coil. Advantageously, the winding is constituted by conductive wires with a heat-adhering and/or heat-weldable coating. A magnetic flux concentrator 18, of annular shape, partially envelopes the induction coil 17. The concentrator 18 is produced in the form of a flange with a central core 19 extending radially to form a washer whose edges are prolonged axially by two coaxial cylindrical parts 20, 21. The cylindrical parts 20 and 21 of the concentrator 18 are oriented axially towards the free face of the multipole rings 14, 15 of the coder element, with the corresponding respective diameters substantially identical to one another. A leaktight lip 22 is provided between the coder element 11 and the sensor element 12 on the one hand so as to protect the device of the invention against various projections and inclemency, and on the other hand so as to avoid leaks of grease contained in the bearing into the exterior environment.

Figure 4:
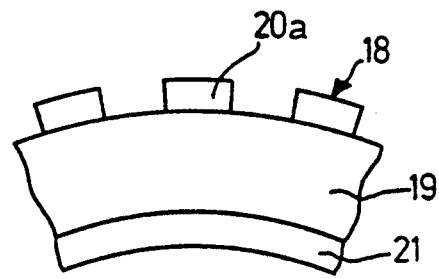
FIGS. 4 and 5 show schematically shapes of the magnetic flux concentrator matched to the coder element of FIG. 3.

In FIGS. 3 to 6 are represented various configurations of the two concentric multipole rings 14 and 15 and of the magnetic flux concentrator 18. FIG. 4 shows the concentrator 18 whose outer cylindrical part 20 is provided with axial teeth 20a. The circumferential width of each tooth 20a preferably being identical to the width of each magnetic pole of the corresponding ring 14. The same is true for the space between two consecutive teeth of the concentrator. Thus, when a tooth 20a is facing a magnetic pole of the ring 14, all the remaining teeth 20a of the concentrator are simultaneously facing the magnetic poles of the ring 14 having the same polarity. Thereby, the magnetic field lines generated by the multipole ring 14 are picked up directly by the axial teeth 20a of the concentrator 18 and are channeled by the concentrator via its central core 19 and its second cylindrical part 21 so as finally to be reinstated in the magnetic poles of the ring 15 having a polarity opposite to that of the poles of the ring 14 which generated the field. Furthermore, between the two multipole rings there is a direct circulation of the flux lines, virtually without spurious leakages, the said flux lines being channeled naturally from one ring to the other by way of the radial flank of the ferromagnetic carrier.

It will be understood that the looping back of the field lines between the sensor and the multipole rings is excellent with consequently an intensification of the field picked up in the flux concentrator 18 and hence an intensification in the electrical signal induced in the induction coil of the sensor element.

Figure 5:
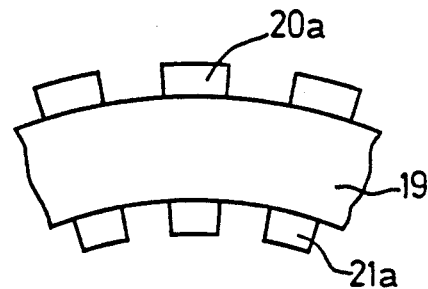
Figure 6:
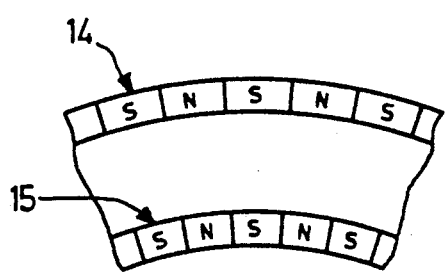
FIG. 6 shows schematically another arrangement of the magnetic poles on the multipole rings of the coder element.
Figure 7:
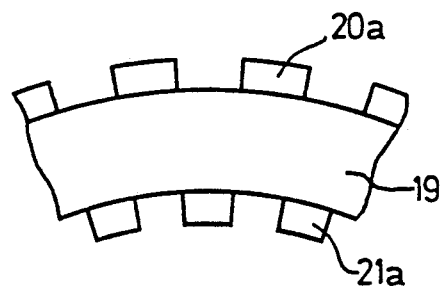
FIG. 7 shows a shape of the flux concentrator matched to the configuration of the multipole rings shown in FIG. 6.

As illustrated in FIGS. 5 and 7, it is also possible to produce axial teeth 21a on the cylindrical part 21. It is sufficient in fact to produce the teeth 21a with the same care as the teeth 20a when referring to the corresponding multipole ring 15. Depending on the arrangement of the magnetic poles on the rings 14 and 15, the teeth 21a can be angularly offset, or not, relative to the teeth 20a with a view to producing magnetic circuits between two magnetic poles of opposite polarity belonging to the ring 14 and to the ring 15 respectively. To return to FIG. 4, it is obviously possible to produce flux-collecting teeth solely on the cylindrical part 21 instead of the cylindrical part 20 to obtain an identical result. The flux concentrator 18 provided with axial teeth 20a and/or 21a can be used for a conventional coder element with a single multipole ring, but with a smaller yield than in the case where the coder element includes two multipole rings.

Figure 8:
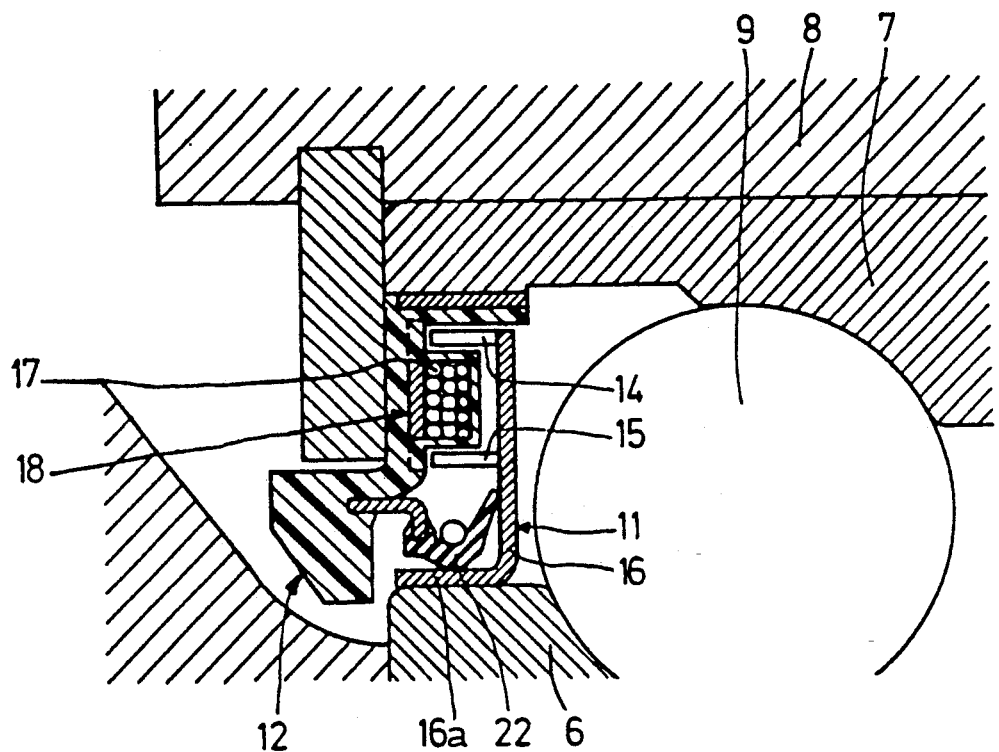
FIG. 8 is a detail view of FIG. 1 according to another embodiment of the invention.
Figure 9:
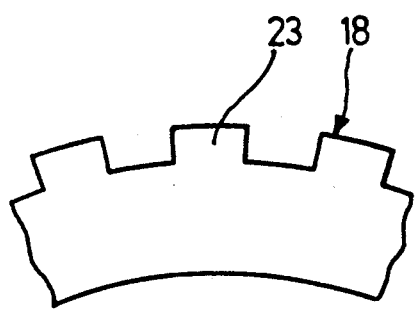
FIGS. 9 and 10 show two shapes of the flux concentrator suited to the embodiment shown in FIG. 8.
Figure 10:
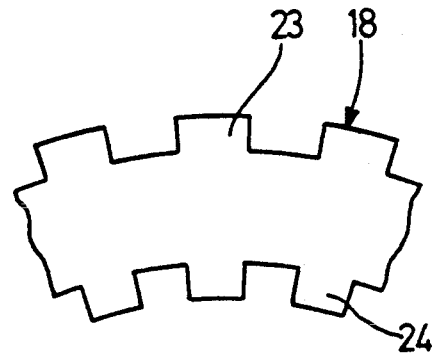

The embodiment shown in FIG. 8 differs from that illustrated by FIG. 2 only through the shape of the magnetic flux concentrator 18. It is indeed possible to obtain an equivalent result with the multipole rings 14 and 15 which are axially wider in order to form a space in which to locate the induction coil 17 of the coder element 12. Thus, the magnetic flux concentrator 18 can have a washer shape provided circumferentially with teeth 23, 24 distributed uniformly and extending radially outward and/or inward (FIG. 9 and FIG. 10). The teeth 23, 24 of the concentrator 18 serve as collector branches of the magnetic field lines generated by the multipole rings 14, 15 of the coder element 11. As for the concentrator illustrated in FIGS. 4, 5 and 7, the teeth 23, 24 are dimensioned as a function of the width of each magnetic pole of the multipole rings 14 and 15.

Figure 11:
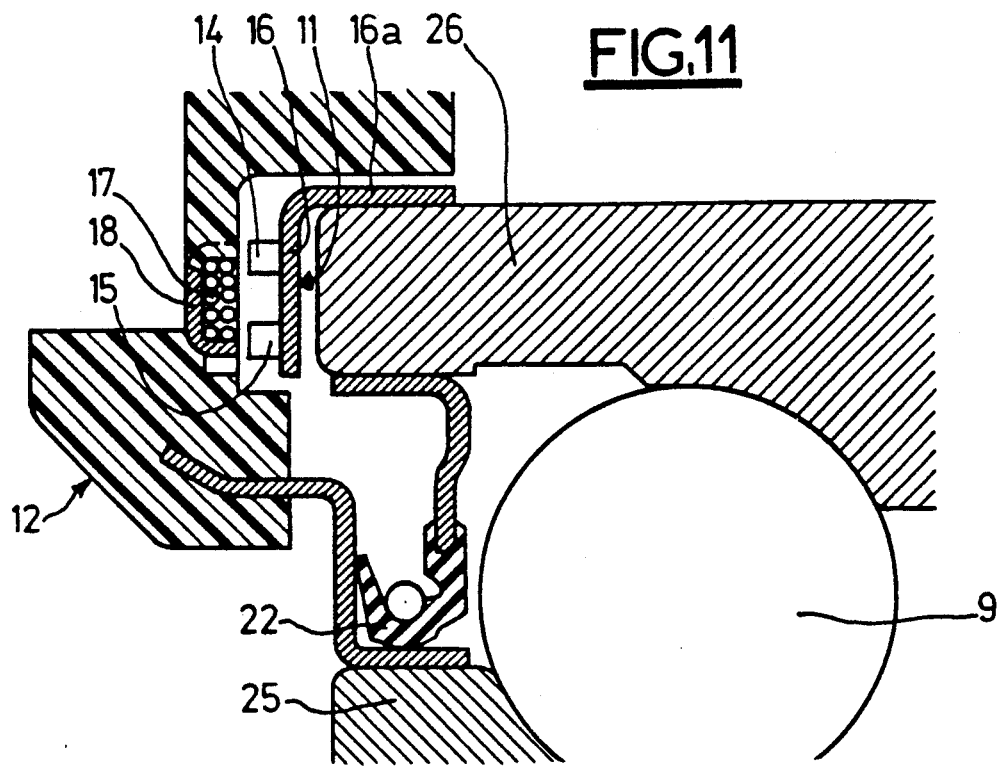
FIG. 11 is a detail view in respect of another embodiment of the device of the invention.

In FIG. 11 is represented another embodiment of the device of the invention adapted to the case where the inner races 25 of the roller bearing are fixed whilst the outer race 26 can rotate. In this case, the coder element 11 is fitted by way of the tubular part 16a of the carrier flange 16 on the rotating outer race 26 of the roller bearing. The sensor element 12 is made rigid with the fixed inner race 25. The relationships between the coder element 11 and the sensor element 12 remain unchanged by comparison with the embodiments described previously.

Figure 12:
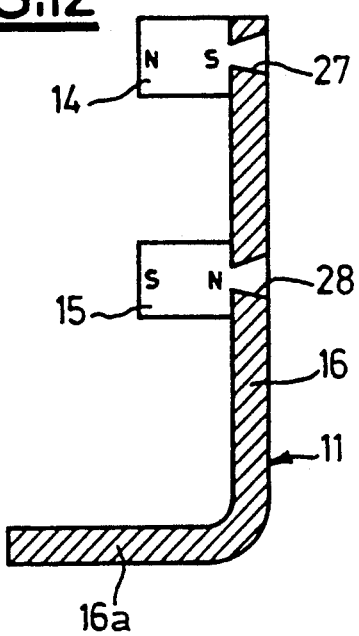
FIGS. 12 and 13 show schematically the coder element with the multipole rings molded over the carrier.
Figure 13:
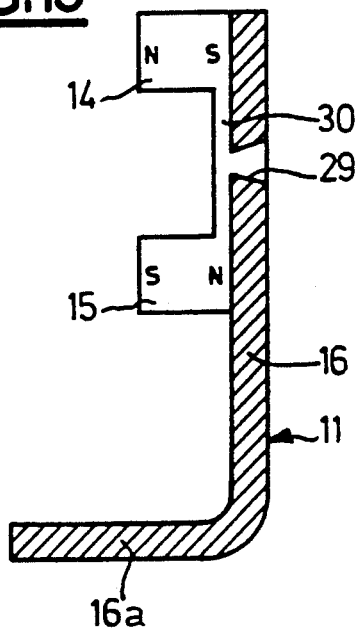

In FIGS. 12 and 13 are shown two embodiments of the coder element 11. The carrier flange 16 can have fastening holes 27, 28 distributed circumferentially over two circular paths whose respective diameters are substantially the same as those of the multipole rings 14, 15 of the coder element 11 to be produced. The rings 14, 15 can be an elastomer or a plastic material molded over in the region of the fastening holes 27 and 28. Once molded over, the concentric rings 14 and 15 are magnetized axially with the aid of appropriate means.

It is also possible to provide a single series of fastening holes 29 distributed circumferentially over a circular path of diameter included between the respective diameters of the rings 14 and 15 to be produced. The molding over can leave a link area 30 between the rings 14 and 15, this so as mechanically to strengthen the rings 14 and 15 which alone will be magnetized to constitute the active part of the coder element 11.

Figure 14:
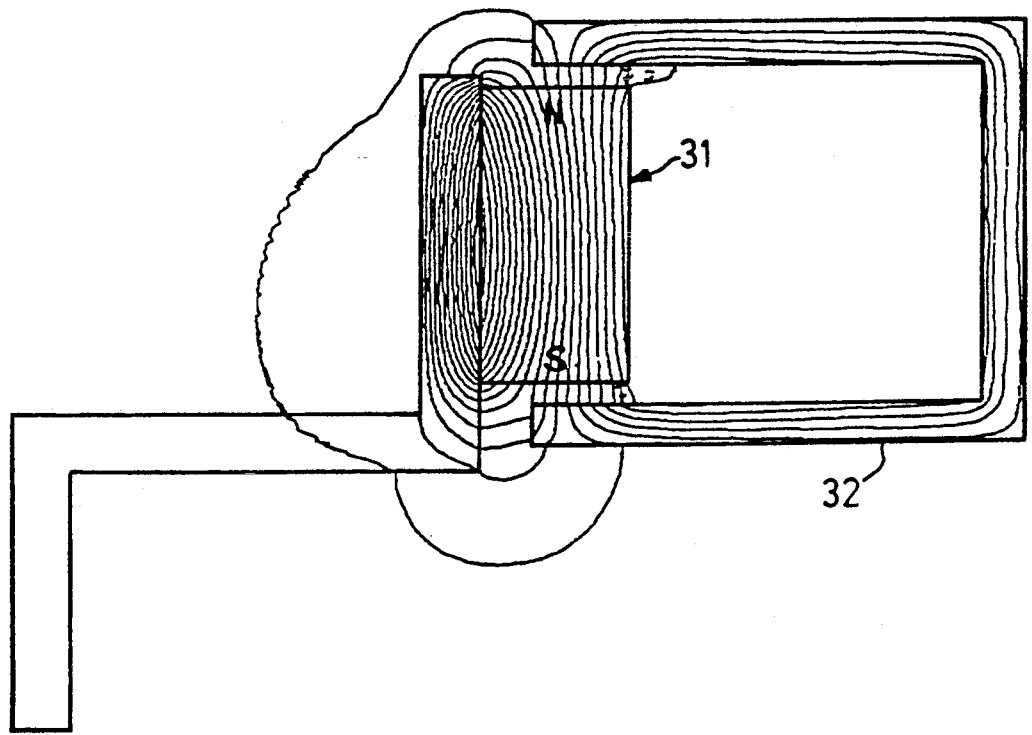
FIGS. 14 and 15 show schematically the distribution of magnetic field lines corresponding respectively to a conventional single multipole ring and to two multipole rings according to the invention.
Figure 15:
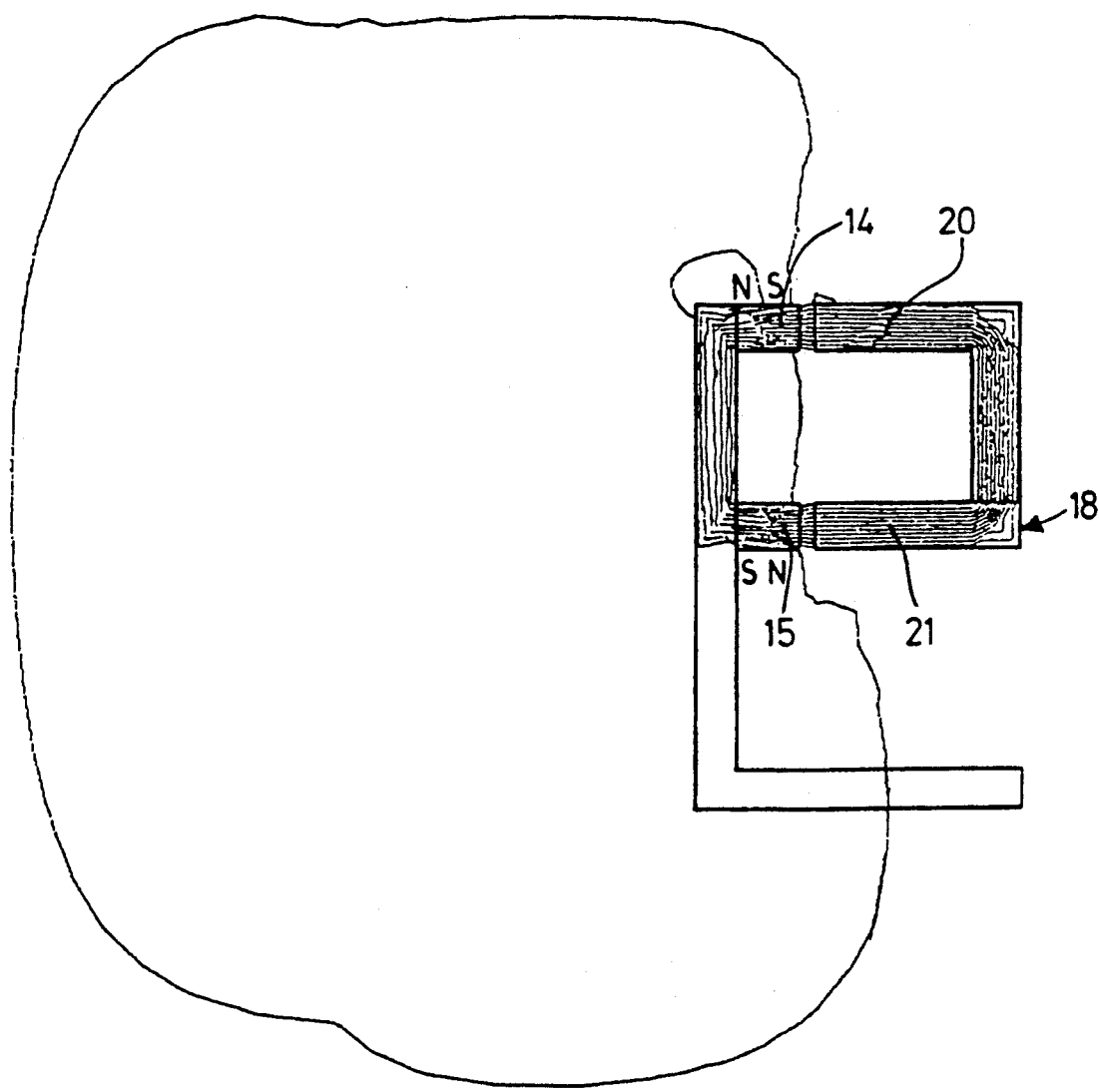

So as to illustrate the difference in leakage of magnetic field lines between the conventional solution and the invention, FIGS. 14 and 15 show schematically the distribution of field lines in the two cases. With the conventional solution (FIG. 14) consisting of a single multipole ring 31 as coder element, the concentrator 32 allows only a small part of the field lines generated by the ring 31 to be collected. Whereas the present invention (FIG. 15) allows an optimal arrangement of the multipole rings 14 and 15 facing the corresponding collecting branches 20 and 21 of the flux concentrator 18, thus entailing a much lesser leakage of field lines than the conventional solution.

We claim:

1. A sensor device for sensing a speed of rotation of a rotating member mounted by a roller bearing on a non-rotating member, said roller bearing including a non-rotating race and a rotating race, said device comprising:
 a coder element which is rigid with said rotating race of the bearing, said coder element having two axially magnetized concentric multipole rings which are means for producing an alternating magnetic field while rotating, and
 a sensor element which is rigid with said non-rotating race of the bearing, said sensor element having a magnetic flux concentrator and an induction coil which is coaxial with the multipole rings, said magnetic flux concentrator having two collector branches for concentrating magnetic flux generated by the multipole rings to the induction coil, said collector branches having diameters which are substantially the same as their respective multipole rings, said collector branches each axially facing a respective one of said multipole rings and being spaced therefrom by an air gap.

2. The device as claimed in claim 1, wherein the magnetic flux concentrator of the sensor element has a central core extending radially between two coaxial cylindrical parts, said cylindrical parts including said collector branches, at least one of said collector branches having uniformly distributed axial teeth which face at least one of the multipole rings.

3. The device as claimed in claim 2, wherein the axial teeth have a same circumferential width as that of a magnetic pole of the corresponding multipole rings, said teeth being separated from one another by a gap of like width.

4. The device as claimed in claim 1, wherein the magnetic flux concentrator has a washer shape provided circumferentially with said collector branches at least one of which has radial teeth which axially face at least one of the multipole rings.

5. The device as claimed in claim 4, wherein the radial teeth have a same circumferential width as that of a magnetic pole of the corresponding multipole rings, said teeth being separated from one another by a gap of like width.

6. The device as claimed in claim 5 including an annular flange which has a tubular part fitted onto the rotating race of the roller bearing, said multipole rings of the coder element being fixed to said annular flange.

7. The device as claimed in claim 1 including an annular flange which has a tubular part fitted onto the rotating race of the roller bearing, said multipole rings of the coder element being fixed to said annular flange.

8. The device as claimed in claim 7, wherein the magnetic flux concentrator of the sensor element has a central core extending radially between two coaxial cylindrical parts, said cylindrical parts including said collector branches, at least one of said collector branches having uniformly distributed axial teeth which face at least one of the multipole rings.

9. The device as claimed in claim 7, wherein the magnetic flux concentrator has a washer shape provided circumferentially with said collector branches at least one of which has radial teeth which axially face at least one of the multipole rings.

10. The device as claimed in claim 9, wherein the radial teeth have a same circumferential width as that of a magnetic pole of the corresponding multipole rings, said teeth being separated from one another by a gap of like width.

11. The device as claimed in claim 7, wherein the multipole rings are formed of a molded material loaded with particles of magnetizable material which is molded over the flange and is subsequently magnetized axially, said flange having fastening areas.

12. The device as claimed in claim 11, wherein the magnetic flux concentrator of the sensor element has a central core extending radially between two coaxially cylindrical parts, said cylindrical parts including said collector branches, at least one of said collector branches having uniformly distributed axial teeth which face at least one of the multipole rings.

13. The device as claimed in claim 12, wherein the axial teeth have a same circumferential width as that of a magnetic pole of the corresponding multipole rings, said teeth being separated from one another by a gap of like width.

14. The device as claimed in claim 13, wherein the magnetic flux concentrator has a washer shape provided circumferentially with said collector branches at least one of which has radial teeth which axially face at least one of the multipole rings.

15. The device as claimed in claim 14, wherein the radial teeth have a same circumferential width as that of a magnetic pole of the corresponding multipole rings, said teeth being separated from one another by a gap of like width.

16. A roller bearing comprising a rotating race, a non-rotating race, and bearing elements between said races; said roller bearing being equipped with a sensor device for sensing a speed of rotation of the rotating race relative to the non-rotating race, said sensor device comprising:

a coder element which is rigid with said rotating race of the bearing, said coder element having two axially magnetized concentric multipole rings which are means for producing an alternating magnetic field while rotating, and a sensor element which is rigid with said non-rotating race of the bearing, said sensor element having a magnetic flux concentrator and an induction coil which is coaxial with the multipole rings, said magnetic flux concentrator having two collector branches for concentrating magnetic flux generated by the multipole rings to the induction coil, said collector branches having diameters which are substantially the same as their respective multipole rings, said collector branches each axially facing a respective one of said multipole rings and being spaced therefrom by an air gap.

17. A roller bearing comprising a rotating race, a non-rotating race, and bearing elements between said races; said roller bearing being equipped with a sensor device for sensing a speed of rotation of the rotating race relative to the non-rotating race, said sensor device comprising:

a coder element which is rigid with said rotating race of the bearing, said coder element having two axially magnetized concentric multipole rings which are means for producing an alternating magnetic field while rotating, said coder element including an annular flange with fastening areas for the multipole rings and a tubular part fitted onto the rotating race of the bearing, said multipole rings being formed of a molded material loaded with particles of a magnetizable material which is molded over the flange, a sensor element which is rigid with said non-rotating race of the bearing, said sensor element having a magnetic flux concentrator and an induction coil which is coaxial with the multipole rings, said magnetic flux concentrator having two collector branches for concentrating magnetic flux generated by the multipole rings to the induction coil, said collector branches having diameters which are substantially the same as their respective multipole rings, said collector branches each axially facing a respective one of said multipole rings and being spaced therefrom by an air gap.

* * * * *